United States Patent
Wuzik et al.

(10) Patent No.: US 7,297,200 B2
(45) Date of Patent: Nov. 20, 2007

(54) WATER-SOLUBLE YELLOW AZO DYES

(75) Inventors: Andreas Wuzik, Untermeitingen (DE); Josef Geisenberger, Sulzbach (DE); Heidemarie Menzel, Bad Soden (DE)

(73) Assignee: Clariant Produkte (Deutschland) GmbH, Sulzbach (DE)

( * ) Notice: Subject to any disclaimer, the term of this patent is extended or adjusted under 35 U.S.C. 154(b) by 478 days.

(21) Appl. No.: 10/504,495

(22) PCT Filed: Feb. 3, 2003

(86) PCT No.: PCT/EP03/01021

§ 371 (c)(1),
(2), (4) Date: Aug. 12, 2004

(87) PCT Pub. No.: WO03/068139

PCT Pub. Date: Aug. 21, 2003

(65) Prior Publication Data

US 2005/0090654 A1  Apr. 28, 2005

(30) Foreign Application Priority Data

Feb. 13, 2002 (DE) .............................. 102 05 853

(51) Int. Cl.
C09D 11/00 (2006.01)
(52) U.S. Cl. .................. 106/31.51; 534/700; 534/739; 534/749; 534/750; 564/200
(58) Field of Classification Search ............... 534/700, 534/739, 749, 750; 564/200; 106/31.51
See application file for complete search history.

(56) References Cited

U.S. PATENT DOCUMENTS

| | | | |
|---|---|---|---|
| 1,982,675 A * | 12/1934 | Law ............................ | 564/200 |
| 1,984,096 A | 12/1934 | Straub et al. | |
| 2,310,181 A * | 2/1943 | Mackenzie ................... | 534/739 |
| 2,969,351 A * | 1/1961 | Grossmann ................... | 534/700 |
| 3,036,059 A * | 5/1962 | Ehrhardt et al. ............. | 534/741 |
| 3,304,328 A * | 2/1967 | Pelley ........................ | 564/200 |
| 3,925,346 A | 12/1975 | Buehler et al. | |
| 4,024,124 A | 5/1977 | Ribka et al. | |
| 4,906,735 A | 3/1990 | Hunger | |
| 6,117,606 A | 9/2000 | Macholdt et al. | |
| 6,504,045 B2 | 1/2003 | Jung et al. | |
| 6,602,342 B2 | 8/2003 | Schmidt et al. | |

FOREIGN PATENT DOCUMENTS

| | | |
|---|---|---|
| DE | 1939466 | 12/1971 |
| DE | 2533958 | 2/1977 |
| EP | 0077025 | 4/1983 |
| EP | 0755984 | 1/1997 |
| GB | 832206 | 4/1960 |
| GB | 902017 | 7/1962 |
| GB | 944409 | 12/1963 |
| GB | 2358023 | 7/2001 |
| JP | 07252426 | 10/1995 |
| JP | 36008730 | 6/2001 |

OTHER PUBLICATIONS

English Translation of PCT IPER for PCT/EP 2003/001021, mailed Apr. 28, 2005.
Database Crossfire Beilstein, Bielstein Institut Z. Foerd. Der Chem. Wissensch., Frankfurt Am. Main, DE. Database Accession No. 1829970, (Apr. 28, 1992).
Database Crossfire Beilstein, Bielstein Institut Z. Foerd. Der Chem. Wissensch., Frankfurt Am. Main, DE. Database Accession No. 1835247, (Jun. 29, 1989).
Database Crossfire Beilstein, Bielstein Institut Z. Foerd. Der Chem. Wissensch., Frankfurt Am. Main, DE. Database Accession No. 5089598, (Jul. 19, 1994).
Database Crossfire Beilstein, Bielstein Institut Z. Foerd. Der Chem. Wissensch., Frankfurt Am. Main, DE. Database Accession No. 6737212, (Jul. 18, 2004).
Database Crossfire Beilstein, Bielstein Institut Z. Foerd. Der Chem. Wissensch., Frankfurt Am. Main, DE. Database Accession No. 1829971, (Apr. 28, 1992).
Database Crossfire Beilstein, Bielstein Institut Z. Foerd. Der Chem. Wissensch., Frankfurt Am. Main, DE. Database Accession No. 1836320, (Jun. 2, 1992).
Database Crossfire Beilstein, Bielstein Institut Z. Foerd. Der Chem. Wissensch., Frankfurt Am. Main, DE. Database Accession No. 3068478, (Sep. 11, 1989).
Database Crossfire Beilstein, Bielstein Institut Z. Foerd. Der Chem. Wissensch., Frankfurt Am. Main, DE. Database Accession No. 6298927, (Jan. 21, 1994).
Database Crossfire Beilstein, Bielstein Institut Z. Foerd. Der Chem. Wissensch., Frankfurt Am. Main, DE. Database Accession No. 6739854, (Jul. 18, 1994).

* cited by examiner

Primary Examiner—Fiona T Powers
(74) Attorney, Agent, or Firm—Anthony A. Bisulca

(57) ABSTRACT

A dye of the formula (2) and a process for preparing the same, wherein the radicals are as defined in the specification

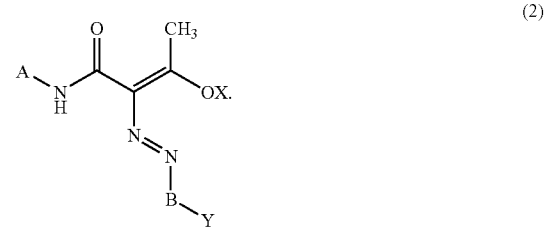

(2)

7 Claims, No Drawings

WATER-SOLUBLE YELLOW AZO DYES

The present invention describes new water-soluble yellow azo dyes, processes for preparing them and their use as recording fluids, especially for the ink-jet printing process.

The ink-jet process is a contactless printing process, where generally a distinction is made between two printing techniques: drop on demand and continuous stream. The drop-on-demand principle is that the ink in the form of a droplet from a nozzle is placed—under electronic control—in the right place at the right time, whereas in continuous stream printing the ink is delivered continuously and then, likewise after electronic charging, either impinges on the receiving medium (paper for example) or is diverted into a collecting vessel. To obtain prints of high definition and resolution the recording fluids and the dyes present in them have to meet corresponding requirements, particularly with regard to lightfastness and waterfastness. High lightfastness is of great importance in particular for exterior ink-jet applications and in the production of ink-jet prints of photographic quality.

The most important part in all this is played by the dyes used in the inks. Despite the development of a large number of dyes there are only a few which meet the requirements imposed on them in a modern-day printing operation.

Initially water-soluble reactive dyes based on the 1,3,5-triazine structural unit, which are used for dyeing or printing cotton fibers (textile printing), were employed. Their usefulness for producing ink-jet inks for ink-jet printing, however, is only limited, since the storage stability of the resultant inks is low and the lightfastnesses of the prints obtained are poor. If the possibility is exploited of allowing targeted reaction of the reactive anchor of such dyes with nucleophiles, the result, for example, is yellow compounds of the formula (1) in accordance with EP-A-0 755 984:

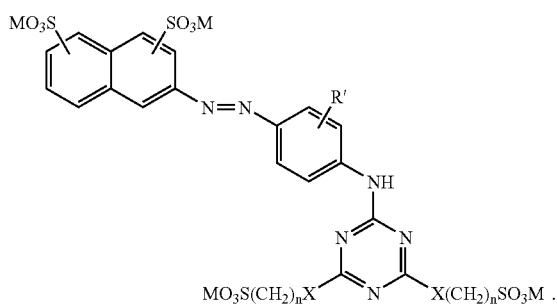

(1)

These dyes are distinguished by high lightfastness; a drawback found, however, has been the sensitivity to hydrolysis and, consequently, a low stability on storage.

There is therefore a need for improved colorants which are superior to the existing yellow dyes, in particular in storage stability, and at the same time have the other properties required for the ink-jet sector.

It has been found that the azo compounds of the formula (2) and their tautomeric forms possess a high storage stability in conjunction with excellent waterfastness and good lightfastness.

The present invention accordingly provides dyes of the formula (2)

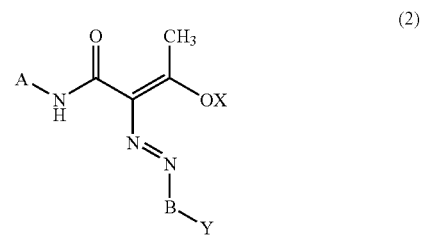

(2)

in which

A and B are identical or different and are a $C_6$-$C_{10}$-aryl radical which is unsubstituted or substituted by 1, 2, 3 or 4 substituents from the group consisting of $C_1$-$C_6$-alkyl, hydroxyl, $C_1$-$C_6$-alkoxy, carboxyl, sulfo, sulfonamide, amino and $C_1$-$C_6$-alkylamino; or are a 5- to 7-membered aromatic heterocycle which may be benzo-fused and may carry 1, 2, 3 or 4 of the aforementioned substituents, or in which A is a radical of an azo dye of the formula (2a)

$$D^1\text{-}N\!\!=\!\!N\text{-}D^2\text{-} \qquad (2a)$$

in which $D^1$ and $D^2$ are identical or different and are a $C_6$-$C_{10}$-aryl radical which is unsubstituted or substituted by 1, 2, 3 or 4 substituents from the group consisting of $C_1$-$C_6$-alkyl, hydroxyl, $C_1$-$C_6$-alkoxy, carboxyl, sulfo, sulfonamide, amino and $C_1$-$C_6$-alkylamino;

Y is a group which contains oxygen and/or nitrogen and which if desired via X of the enolate function forms a 9- or 10-membered ring;

X is hydrogen, a monovalent metal cation, one equivalent of a polyvalent metal cation or a $C_1$-$C_4$-alkyl-, phenyl- or $(C_1$-$C_4)$-alkoxy-$(C_1$-$C_4)$-alkyl-substituted ammonium ion.

Preferred azo dyes of the formula (2) are those in which A and B are phenyl, naphthyl, pyridyl or pyrazolyl which may be substituted by 1 or 2 substituents from the group consisting of methyl, ethyl, propyl, hydroxyl, methoxy, ethoxy, propoxy, carboxyl, sulfo, sulfonamido, amino and methylamino.

Preferred azo dyes of the formula (2) are additionally those in which A is a radical of the formula (2a) in which $D^1$ and $D^2$ are phenyl or naphthyl which may be substituted by 1 or 2 substituents from the group consisting of methyl, ethyl, propyl, hydroxyl, methoxy, ethoxy, propoxy, carboxyl, sulfo, sulfonamido, amino and methylamino.

Preferred azo dyes of the formula (2) are additionally those in which

Y is hydroxyl, methoxy, carboxyl or amino.

Preferred azo dyes of the formula (2) are additionally those in which

X is hydrogen, Na, K or a transition metal cation.

Particularly preferred azo dyes of the formula (2) are additionally those in which A and B are each a phenyl or naphthyl radical substituted by 1 or 2 sulfo and/or carboxyl groups.

Particularly preferred azo dyes of the formula (2) are additionally those in which A is a radical of the formula (2a) in which $D^1$ is a phenyl or naphthyl radical substituted by 1 or 2 sulfo groups and $D^2$ is a phenyl radical substituted by sulfo, hydroxyl or methoxy.

Particularly preferred azo dyes of the formula (2) are additionally those in which X is Cu, Co, Ni, Fe or Cr which together with Y forms a 9- or 10-membered ring. In particular X is Cu.

The present invention also provides a process for preparing the dyes of the formula (2) which comprises reacting the amine of the formula (3)

A-NH₂ (3)

with diketene (4)

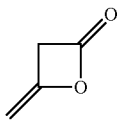
(4)

and coupling the resulting compound of the formula (5) and/or its tautomer

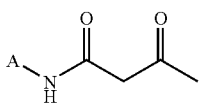
(5)

with the diazonium salt of the formula (6),

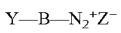
Y—B—N₂⁺Z⁻ (6)

and, if desired, further reacting the coupling product with a metal salt solution or ammonium salt solution.

The reaction of (3) with (4) takes place preferably at from 0 to 40° C. and at a pH of from 4 to 9.

The diazotization and coupling steps can be carried out in accordance with conventional methods.

The diazotization is preferably conducted in aqueous solution or suspension with sodium nitride at temperatures from 0 to 10° C. and at a pH of between 1 and 3. The azo coupling is preferably conducted in aqueous solution or suspension at temperatures from 0 to 20° C. and at a pH of between 3 and 9.

The molar ratios between the respective diazonium salt and the respective coupling component are preferably 1: (0.8 to 2).

Complexing with a metal takes place advantageously by adding an aqueous metal salt solution, e.g. a metal sulfate, chloride, bromide, hydrogen sulfate, bicarbonate or carbonate. Depending on the particular dye the complexing may be conducted in the acidic range and in the basic range. The temperature ought to be between 60 and 130° C.; if desired, heating is carried out under superatmospheric pressure.

The dyes of the invention can be isolated from the as-obtained, preferably aqueous reaction mixtures by salting out, filtration or spray drying, with or without partial or complete prior desalting by means of membrane filtration. However, an isolation step may also be omitted and the reaction mixtures comprising the dyes of the invention may be converted directly into concentrated dye solutions by adding organic and/or inorganic bases and/or humectants and, if desired, after partial or complete desalting by means of membrane filtration. Alternatively the complex dyes may also be used as presscakes (in flushing processes as well, if appropriate) or as powders. For further purification, the dyes in the form of their aqueous solutions can be passed over an ion exchange resin.

The dyes of the invention may further comprise a shading colorant, preferably from the group of the colorants listed in the Colour Index, such as C.I. Acid Yellow 17 and 23, C.I. Direct Yellow 86, 98 and 132, C.I. Reactive Yellow 37, C.I. Pigment Yellow 17, 74, 83, 97,120, 139, 151, 155 and 180; C.I. Direct Red 1, 11, 37, 62, 75, 81, 87, 89, 95, 227; C.I. Acid Red 1, 8, 80, 81, 82, 87, 94, 115, 131, 144, 152, 154, 186, 245, 249 and 289; C.I. Reactive Red 21, 22, 23, 35, 63, 106, 107, 112, 113, 114, 126, 127, 128, 129, 130, 131, 137, 160, 161, 174, 180; C.I. Pigment Red 122, 176, 184, 185 and 269; C.I. Direct Blue 199, C.I. Acid Blue 9, C.I. Pigment Blue 15:1-15:4. The shading colorant is preferably present in an amount of from 0.001 to 5% by weight, in particular from 0.01 to 1% by weight, based on the dry weight of the dye of the invention.

The dyes of the invention can be mixed with the shading colorant by mixing the dyes of the formula (2) and the shading colorant with one another in the proportions indicated in the form of dry powders, solutions thereof, water- or solvent-moist presscakes and/or masterbatches, or inks produced from the dyes can be shaded.

The present invention further provides for the use of the (shaded or unshaded) dyes of the formula (2) for dyeing and printing natural and synthetic fiber materials, such as polyester, silk, wool or blend fabrics, for example, particularly for the recording of text and images on various recording media, and also for pulp coloring paper or celluloses.

For use in recording fluids the dyes described are prepared in accordance with the stated requirements. The dyes can be isolated from the as-obtained, preferably aqueous reaction mixtures by salting out and filtration or by spray drying, if desired after partial or complete desalting by means of membrane filtration and/or ion exchange. An alternative is to dispense with isolation and to convert the dye-containing reaction mixtures directly into concentrated dye solutions by adding organic and/or inorganic bases, possibly humectants, preservatives and, if desired, after partial or complete desalting by means of membrane filtration. Alternatively the dyes may also be used as presscakes (in flushing processes as well, if appropriate) or as powders. Advantageously the dyes of the invention are used as far as possible in pure and salt-free form, i.e., free from NaCl or other customary inorganic salts formed during the synthesis of the dyes.

Examples of inorganic bases suitable for concentrated dye solutions include lithium hydroxide, lithium carbonate, sodium hydroxide, sodium hydrogencarbonate, sodium carbonate, potassium hydroxide, potassium carbonate and ammonia. Examples of suitable organic bases include monoethanolamine, diethanolamine, triethanolamine, 2-aminopropanol, 3-aminopropanol, dipropanolamine, tripropanolamine, N-methylaminoethanol, N,N-dimethylaminoethanol, N-phenylaminopropanol, ethylenediamine, tetramethylethylenediamine, tetramethylpropylenediamine, tetramethylhexylenediamine, diethylenetriamine, triethylenetetramine, triethylamine, diisopropylethylamine and polyethyleneimine.

Examples of humectants suitable for concentrated dye solutions include formamide, urea, tetramethylurea, ε-caprolactam, ethylene glycol, diethylene glycol, triethylene glycol, polyethylene glycol, butyl glycol, methyl Cellosolve, glycerol, N-methylpyrrolidone, 1,3-diethyl-2-imidazolidinone, sodium xylenesulfonate, sodium cumenesulfonate and sodium butyl monoglycol sulfate.

The dyes of the invention are particularly suitable for producing recording fluids, especially inks on an aqueous and non-aqueous basis for the ink-jet printing process, and also for those inks which operate in accordance with the hot-melt process or are based on microemulsions, but also for other printing, reproduction, marking, writing, drawing, stamping or registration processes.

The present invention additionally provides recording fluids which comprise a dye of the invention and, if desired, other colorants for shading, as described above. Shading colorants of this kind are advantageously present in an amount of from 0 to 20% by weight, preferably from 0.01 to 10% by weight, in particular from 0.1 to 5% by weight, based on the total weight of the recording fluid.

The composition of the recording fluid must be adapted to the particular end use.

Recording fluids of the invention generally contain in total from 0.1 to 50% by weight of the dye of the formula (2) and, if desired, the shading colorant, calculated as dry weight, from 0 to 99% by weight of water and from 0.5 to 99.5% by weight of organic solvent and/or humectant. In one preferred embodiment the recording fluids contain from 0.5 to 15% by weight of said dye, calculated as dry weight, from 35 to 75% by weight of water and from 10 to 50% by weight of organic solvent and/or humectant; in another preferred embodiment from 0.5 to 15% by weight of said dye, calculated as dry weight, from 0 to 20% by weight of water and from 70 to 99.5% by weight of organic solvent and/or humectant.

The dyes (2) and recording fluids comprising them are prepared using water preferably in the form of distilled or demineralized water.

The solvents and/or humectants present in the recording fluids may comprise an organic solvent or a mixture of such solvents, preference being given to water-miscible solvents. Suitable solvents are, for example, monohydric or polyhydric alcohols, their ethers and esters, e.g., methanol, ethanol, propanol, isopropanol, butanol, isobutanol; dihydric or trihydric alcohols, in particular with 2 to 6 carbon atoms, e.g., ethylene glycol, propylene glycol, 1,3-propanediol, 1,4-butanediol, 1,5-pentanediol, 1,6-hexanediol, 1,2,6-hexanetriol, glycerol, diethylene glycol, dipropylene glycol, triethylene glycol, polyethylene glycol, tripropylene glycol, polypropylene glycol; lower alkyl ethers of polyhydric alcohols, such as ethylene glycol monomethyl, monoethyl or monobutyl ether, triethylene glycol monomethyl or monoethyl ether, for example; ketones and ketone alcohols such as acetone, methyl ethyl ketone, diethyl ketone, methyl isobutyl ketone, methyl pentyl ketone, cyclopentanone, cyclohexanone and diacetone alcohol, for example; amides, such as dimethylformamide, dimethylacetamide and N-methylpyrrolidone, for example; and also urea, tetramethylurea, thiodiglycol and $\epsilon$-caprolactam.

The recording fluids of the invention may further comprise customary additives, examples being preservatives, cationic, anionic or nonionic surface-active substances (surfactants and wetting agents), and agents for regulating the viscosity, e.g., polyvinyl alcohol, cellulose derivatives, or water-soluble natural or synthetic resins as film formers and/or binders for increasing the adhesion and abrasion resistance. Additionally it is possible for light stabilizers, optical brighteners, oxidizing agents, reducing agents and free-radical scavengers to be present.

It is additionally possible for amines to be present, such as ethanolamine, diethanolamine, triethanolamine, N,N-dimethylethanolamine, diisopropylamine or N-ethyldiisopropylamine, for example, in order to increase the pH of the recording fluid, normally at from 0 to 10% by weight, preferably from 0.5 to 5% by weight, based on the total weight of the recording fluid.

Depending on the embodiment of this ink-jet printing process, as for example a continuous jet, intermittent jet, impulse jet or compound jet process, the recording fluids may be admixed with further additives, for the purpose for example of buffering the pH, adjusting the electrical conductivity, the specific heat capacity, the thermal expansion coefficient and the conductivity.

In the storage of recording fluids of the invention there is no sedimentation of precipitates leading to poorly defined prints or nozzle clogging.

In terms of viscosity and surface tension the recording fluids of the invention are within the ranges appropriate for ink-jet processes. They give prints of high optical density with excellent lightfastness and waterfastness.

Additionally the dyes of the invention could be used as an ink set in combination with magenta, cyan and black colorants. The magenta, cyan and black shades involve not only dyes, such as the C.I. dyes Reactive Red 23, C.I. Reactive Red 180, C.I. Acid Red 52, C.I. Acid Blue 9 and C.I. Direct Blue 199, but also pigments, such as C.I. Pigment Red 122, C.I. Pigment Red 176, C.I. Pigment Red 184, C.I. Pigment Red 185 and C.I. Pigment Red 269, C.I. Pigment Violet 19, C.I. Pigment Blue 15, C.I. Pigment Blue 15:3 and C.I. Pigment Blue 15:4. Black shades are formed for the dyes C.I. Reactive Black 8, C.I. Reactive Black 31, C.I. Direct Black 168, C.I. Sol. Sulfur Black 1 and 2, C.I. Acid Black 194 and carbon black.

The dye mixtures of the invention are further suitable as colorants in electrophotographic toners and developers, such as one-component and two-component powder toners, magnetic toners, liquid toners, polymerization toners and other, specialty toners, for example.

Typical toner binders are addition polymerization, polyaddition and polycondensation resins, such as styrene, styrene-acrylate, styrene-butadiene, acrylate, polyester, phenolic-epoxy resins, polysulfones, polyurethanes, individually or in combination, and also polyethylene or polypropylene, which may also contain further ingredients, such as charge control agents, waxes or flow agents, or may have such ingredients added subsequently.

The dye mixtures of the invention are suitable, furthermore, as colorants in powders and powder coating materials, particularly in triboelectrically or electrostatically sprayed powder coating materials, which are employed for the surface coating of articles made for example from metal, wood, plastic, glass, ceramic, concrete, textile material, paper or rubber.

Powder coating resins used are typically epoxy resins carboxyl- and hydroxyl-containing polyester resins, polyurethane and acrylic resins, together with customary curing agents. Combinations of resins are also used. Thus, for example, epoxy resins are frequently used in combination with carboxyl- and hydroxyl-containing polyester resins.

The dyes of the invention are also suitable as colorants for color filters, both for additive and for subtractive color generation, and also as colorants in electronic inks for "electronic newspapers" and in the medical sector.

In addition to these applications the azo dyes of the invention are also suitable as colorants in printing inks, varnishes, paints, plastics, rubber materials, office articles, wood stain and cleaning products, and artist's colors. Typical printing inks are, for example, offset printing inks, illustration gravure inks, and printing inks for aqueous and solvent-based packaging printing and flexographic printing. Typical coating materials are automotive OEM and refinish materials, industrial coating materials and architectural paints (e.g., polymer renders or emulsion paints). Examples of typical plastics coloring systems are those in plasticized and unplasticized PVC (polyvinyl chloride), polyolefins or polystyrenes.

The dyes of the invention can be used, moreover, for coating the surfaces of articles made for example of metal, wood, plastic, glass, ceramic, concrete, textile material, paper and rubber.

In the fields of application described above, as well, the dyes of the invention may additionally be shaded with the pigments and/or dyes listed above.

In the examples below relating to the preparation of the dyes of the invention and of recording fluids, the lightfastness is determined in accordance with DIN 54003 (blue wool scale).

EXAMPLE 1

Stage A: 0.06 mol of orthanilic acid are suspended in 200 ml of water and adjusted to a pH of 6 with 10 N sodium hydroxide solution. After 5 minutes of stirring at room temperature the orthanilic acid has formed a clear solution. Subsequently 0.18 mol of diketene is added dropwise over the course of 10 minutes and the pH is maintained at from 5.5 to 6.0. The reaction is over after about 1 h.

Stage B: 0.06 mol of 3-amino4-methoxybenzenesulfonic acid are stirred into 150 ml of water in a separate vessel and the pH is adjusted to about 0.5 with 15 ml of 10 N hydrochloric acid. After the solution has been stirred at 0 to 5° C. for 30 minutes, 0.066 mol of sodium nitrite is added and the mixture is stirred for 1 h. The nitrite excess is then removed with 0.75 g of amidosulfonic acid.

Stage C: For the coupling, the intermediate obtained in stage A is cooled to 10° C. and the pH is adjusted to 6. The diazonium salt solution prepared in stage B is added thereto over the course of 30 minutes and the pH is maintained at 4.0-5.0 with 20 g of sodium acetate. Reaction is complete after 1 h to give the dye (7).

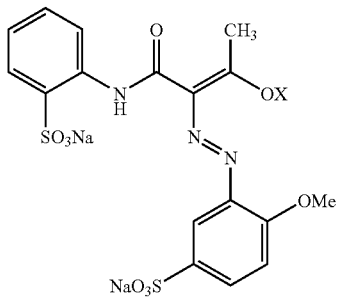

(7)

Alternatively the coupler solution (stage A) can be added to the diazo solution (stage B).

The dye (7) can be added directly to an ink formulation or as described in stage D can be reacted with a copper salt in order to increase the lightfastness further.

Stage D: The dye solution obtained from stage C is heated to 60° C., a solution consisting of 0.066 mol of copper sulfate, ammonia and diethanolamine is added and the combined solutions are heated at about 90° C. for about 1 to 2 h. This gives the dye (8) in the form of an aqueous solution. Lightfastness: 5

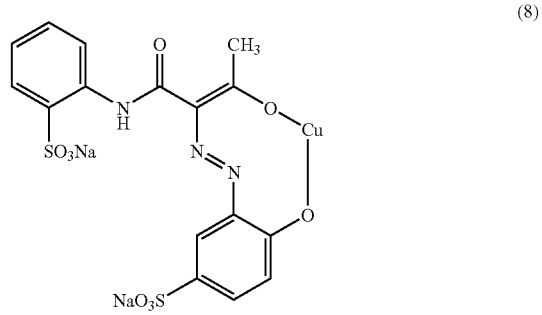

(8)

EXAMPLE 2

In the same way as described in example 1 (stages A-C), the amine unit used is now 2-naphthylamine-6,8-disulfonic acid and the diazo unit used is anthranilic acid. This gives the dye (9). Lightfastness: 4

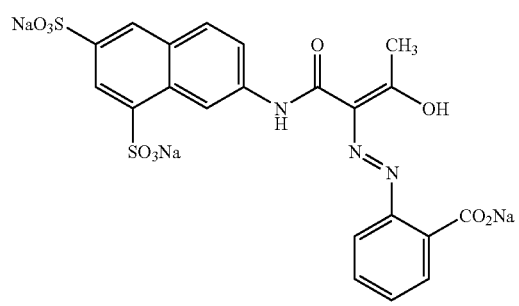

(9)

EXAMPLE 3

In the same way as described in example 1, the amine unit used is now 2-[(4-amino-3-methoxyphenyl)azo]naphthalene-6,8-disulfonic acid and 2-hydroxy-4-sulfoaniline as diazo unit. After the metallation step the dye (10) is obtained, which has a lightfastness of 5.

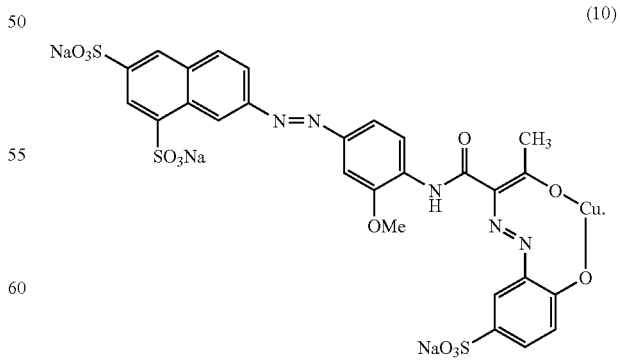

(10)

The dye solutions obtained from the examples are cooled and then subjected to ultrafine filtration through a depth filter (0.1-0.3 μm), passed over a cation exchanger, desalted via a membrane desalting unit and then adjusted for color strength. Preservation is then achieved with a biocide (e.g., ®Proxel GXL).

EXAMPLE 4

Preparation of a Recording Fluid 2.5 g of pure dye from example 1 are introduced with stirring at 25° C. into a mixture of 20.0 g of diethylene glycol, 2.5 g of N-methylpyrrolidone, 1.0 g of triethanolamine and 76.5 g of demineralized water and dissolved.

EXAMPLE 5

Preparation of a Recording Fluid 2.5 g of pure dye from example 2 are introduced with stirring at 25° C. into a mixture of 20.0 g of diethylene glycol, 2.5 g of N-methylpyrrolidone, 1.0 g of triethanolamine, 1.0 g of urea and 75.5 g of demineralized water and dissolved.

EXAMPLE 6

Preparation of a Recording Fluid 2.5 g of pure dye from example 3 are introduced with stirring at 25° C. into a mixture of 20.0 g of diethylene glycol, 1.0 g of triethanolamine, 1.0 g of urea and 78.0 g of demineralized water and dissolved.

The inks prepared in this way give yellow prints with very good lightfastness and storage stability.

To investigate the storage stability the recording fluids prepared are stored at 60° C. for 4 weeks. After this time there are no instances of precipitation observed and the recording fluids can be subjected to ultrafine filtration without residue.

Colorimetric investigations show no changes in relation to the evaluations made prior to the storage stability tests.

The invention claimed is:

1. A recording fluid for recording text and images on recording media comprising at least one dye of the formula (2)

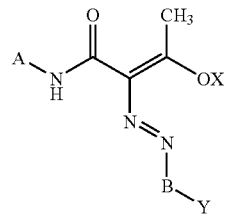

wherein
A and B are identical or different and are a $C_6$-$C_{10}$-aryl radical unsubstituted or substituted by 1, 2, 3 or 4 substituents selected from the group consisting of $C_1$-$C_6$-alkyl, hydroxyl, $C_1$-$C_6$-alkoxy, carboxyl, sulfo, sulfonamide, amino and $C_1$-$C_6$-alkylamino; or are a 5- to 7-membered aromatic heterocycle which, optionally, is benzo-fused and optionally carries 1, 2, 3 or 4 of the aforementioned substituents selected from the group consisting of $C_1$-$C_6$-alkyl, hydroxyl, $C_1$-$C_6$-alkoxy, carboxyl, sulfo, sulfonamide, amino and $C_1$-$C_6$-alkylamino;
Y is a group which contains oxygen and/or nitrogen and, optionally, via X of the enolate function forms a 9- or 10-membered ring;
X is hydrogen, a monovalent metal cation, one equivalent of a polyvalent metal cation or a $C_1$-$C_4$-alkyl-, phenyl- or ($C_1$-$C_4$)-alkoxy-($C_1$-$C_4$)-alkyl-substituted ammonium ion.

2. The recording fluid of claim 1, wherein A and B are phenyl, naphthyl, pyridyl or pyrazolyl.

3. The recording fluid of claim 1, wherein Y is hydroxyl, methoxy, carboxyl or amino.

4. The recording fluid of claim 1, wherein X is hydrogen, Na, K or a transition metal cation.

5. The recording fluid of claim 1, wherein A and B are each a phenyl or naphthyl radical substituted by 1 or 2 sulfo and/or carboxyl groups.

6. The recording fluid of claim 2, wherein A and B are substituted by 1or 2 substituents selected from the group consisting of methyl, ethyl, propyl, hydroxyl, methoxy, ethoxy, propoxy, carboxyl, sulfo, sulfonamido, amino and methylamino.

7. An ink set comprising at least one magenta-colored recording fluid, at least one black recording fluid, at least one cyan-colored recording fluid and at least one recording fluid as claimed in claim 1.

* * * * *